United States Patent [19]

Humbert et al.

[11] 4,092,298
[45] May 30, 1978

[54] POWDER COATING COMPOSITIONS

[75] Inventors: Heiko Humbert, Hamburg; Gundolf Fuchs, Steinbeck, Buchholz; Dietrich Pirck, Seevetal, all of Germany

[73] Assignee: Deutsche Texaco Aktiengesellschaft, Hamburg, Germany

[21] Appl. No.: 687,423

[22] Filed: May 17, 1976

[30] Foreign Application Priority Data

May 17, 1975 Germany ............................ 2522192

[51] Int. Cl.$^2$ ............................................. C08G 63/20
[52] U.S. Cl. ................................. 260/75 T; 260/75 R; 526/13; 526/14; 526/15; 526/16
[58] Field of Search ............. 260/75 T, 75 R; 526/13, 526/14, 15, 16

[56] References Cited

U.S. PATENT DOCUMENTS

| | | | |
|---|---|---|---|
| 3,935,138 | 1/1976 | Wingler et al. ......................... | 526/16 |
| 3,948,834 | 4/1976 | Brussmann et al. ............... | 260/75 T |
| 3,959,215 | 5/1976 | Schneider ........................... | 260/75 T |
| 3,985,713 | 10/1976 | Frisch et al. .......................... | 526/16 |
| 3,991,133 | 11/1976 | Siwiec et al. .......................... | 526/16 |

FOREIGN PATENT DOCUMENTS

| | | | |
|---|---|---|---|
| 2,031,133 | 12/1971 | Germany ........................... | 260/75 R |
| 2,408,486 | 9/1975 | Germany ........................... | 260/75 R |
| 2,415,819 | 10/1975 | Germany ........................... | 260/75 R |
| 2,440,405 | 3/1976 | Germany ........................... | 260/75 R |
| 75,160,580 | 12/1975 | Japan ................................. | 260/75 R |
| 1,408,142 | 10/1975 | United Kingdom ............... | 260/75 T |

*Primary Examiner*—Lucille M. Phynes
*Attorney, Agent, or Firm*—Carl G. Ries; Thomas H. Whaley; Walter D. Hunter

[57] ABSTRACT

Novel powder coating compositions consisting of resinous polyhydroxyl compounds as film-forming agents, a cross-linking agent, an activator, and conventional additives are described. In contrast to the known powder coating compositions, the activator rather than cross-linking agent is blocked. The novel cross-linking agents employed are bisazlactones. Activators for use in cross-linking reactions are strong acids which are blocked, i.e they are employed in the form of their thermolabile esters or amine salts. The powder coating compositions of this invention are storable and they can be baked at predetermined temperatures to provide high gloss and elastic coatings.

13 Claims, No Drawings

POWDER COATING COMPOSITIONS

BACKGROUND OF THE INVENTION

1. Field of the Invention

The present invention relates to powder coating compositions consisting of resinous polyhydroxyl compounds as film-forming agents, a compound comprising at least two functional groups reactive with the hydroxyl groups of said resinous polyhydroxyl compounds, as the cross-linking agent, and further comprising conventional additives, such as levelling agents, etc. and pigments, if so desired.

2. Description of the Prior Art

To produce powder coating compositions the components must be thoroughly mixed so that, following the mixing and powderizing treatments, the individual powder grains are of substantially the same composition which can only be achieved when the mixing is done in a heated extruder. Thereafter, the powder is spread onto the surface to be coated by way of the elctrostatic powder spray coating technique and baked at the required temperature for the respective coating composition. The preparation of powder coating compositions and the processing of such materials to lacquers requires that the individual components be miscible with each other at elevated temperatures and that the cross-linking reation take place only at baking temperatures. In practice, mixing temperatures of at least 90° C, preferably between 100° and 120° C, have been found to be indispensible. The baking temperatures of powder coating compositions range without exception from 180° to 200° C with baking periods of from 20 to 30 minutes. Reduction of the baking temperatures to as low as 170° C has been achieved by means of suitable activators.

Therefore, the powder coating compositions must include cross-linking agents that are not reactive with the hydroxyl groups of the polyhydroxyl compounds at mixing temperatures but which are reactive therewith at baking temperatures. This is achieved by employing cross-linking agents having functional groups protected (i.e., blocked) by compounds split off only at temperatures clearly ranging above said mixing temperatures. The most commonly used cross-linking agents today are diisocyanates or polyisocyanates like toluene diisocyanate, hexamethylene diisocyanate, isophorone diisocyanate; ω-lactams having from 4 to 12 carbon atoms, more especially ε caprolactam, proved to be suitable blocking agents. These blocked cross-linking agents, however, suffer from several disadvantages. For example, they escape while baking said lacquers which means not only establishing suitable hood means but also involves a considerable loss in material since the blocking agents have a relatively high molecular weight compared to the equivalent weight of the —N=C=O group to be blocked. Even though the baking temperature must range clearly above the melting temperature for achieving good processing prior to the cross-linking, the baking temperature should be the lowest possible for reasons of energy costs and in order that the substrate will be subjected only to low thermal stresses.

It is an object of the present invention to provide powder coating compositions that contain an unblocked cross-linking agent in which all components thereof are miscible with each other in the extruder at temperatures above 90° C without any cross-linking reaction taking place, and which can be baked at the lowest possible temperatures.

DETAILED DESCRIPTION OF THE INVENTION

Accordingly, powder coating compositions have been discovered consisting of polymers containing hydroxyl groups as the film-forming agents, a cross-linking agent and the conventional additives such as levelling agents, and pigments if so desired, characterized by a bisazlactone of the general formula I:

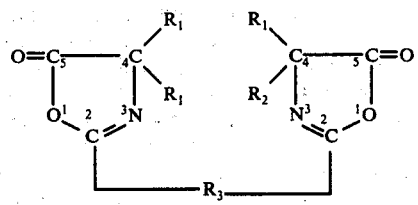

wherein $R_1$ and $R_2$ are selected from the group consisting of hydrogen, alkyl having 1 to 8 carbon atoms, cycloalkyl having from 4 to 16 carbon atoms, aryl having from 6 to 16 carbon atoms, wherein only one of $R_1$ and $R_2$ may be hydrogen, or wherein $R_1$ and $R_2$ together with the C in 4-position form a cycloaliphatic ring having from 4 to 12 carbon atoms; wherein $R_3$ is selected from the group consisting of alkylene having from 2 to 6 carbon atoms or arylene having from 6 to 16 carbon atoms, as the cross-linking agent, and wherein a blocked acid is used as the activator. In formula I aryl and arylene may also be substituted by alkyl of from 2 to 8 carbon atoms or halogen such as chlorine, bromine, or fluorine. It is unpredictable that bisazlactones would prove to be suitable cross-linking agents for resinous polyhydroxyl compounds in the powder coating compositions. In German Auslegeschrift No. 1,645,214 there is described a solvent lacquer system wherein the film-forming component consists of a copolymer of acrylic or methacrylic acid ester and azlactone having in the 2-position a substitutent comprising a polymerizable double bond, and of a compound having at least two functional groups such as amino groups or hydroxyl groups, as the cross-linking agent. Hardening takes place at normal (about 20° C) or slightly elevated temperatures under the influence of acidic or alkaline catalysts. Such film-forming systems which cross-link at such low temperatures are completely unsuitable for use in the production of powder coating compositions. In the Journal American Chemical Society, Vol. 71 (1955), pages 1541 to 1546, Cleaver and Pratt describe the synthesis of bisazlactones, the properties thereof, and the preparation of long-chain, i.e., non-cross-linked, polyamides from these bisazlactones. In this acticle it is disclosed that although the reaction of lactones and alcohols (leading to ester amide linkage and thereby opening the ring, as is well known) is catalyzed by acids as well as bases, these acids and bases are incapable, in the case of bisazlactones, of catalyzing the reaction sufficiently and, as a result, only relatively low molecular weight i.e., short-chain, compounds are formed.

Surprisingly, it has been found that bisazlactones with resinous polyhydroxyl compounds cross-link completely in the presence of strong acids (but not in the presence of bases) at baking temperatures of between 155° to 185° C although the reactivity of the hydroxyl groups of resinous polyhydroxyl compounds is much less than that of low molecular weight compounds, such as alcohols and glycols, as is well known. Furthermore, it has been found that the cross-linking reaction can be controlled in that the said reaction starts only at an elevated temperature, as desired, when blocked acids in catalytic amounts as aforementioned are used as activators.

Thus, a novel system of powder coating compositions has been discovered. This system comprises a non-blocked cross-linking agent easily miscible with said polyhydroxyl compound and the activator in an extruder wherein the temperature is more than 90° C. Since the activator is employed only in an amount of 2 percent by weight at the maximum (basis polyhyroxyl compound) with only a fractional amount of said 2 percent by weight pertaining to said blocking agent, the loss in material in the baking operation is exceptionally low. In addition, the formation of the lacquer surface is, of course, much less adversely affected by virtue of the fact that only a minor amount of material escapes from the surface during baking as compared with those powder coating compositions which utilize 7 percent and more of a blocking agent of which the major portion is released from the lacquer surface during the baking step. With the powder coating compositions of the invention, high gloss and elastic films are obtained. Resinous polyhydroxyl compounds suitable for use in the powder coating compositions of this invention are any polymers comprising hydroxyl groups generally used for lacquer resins, for instance, polyesters, copolymers, acrylic resins, etc. having free hydroxyl groups. Useful resinous polyhydroxyl compounds suitable for preparing the novel powder coating compositions of this invention include polyesters of glycols and terephthalic acid modified with a certain amount of triols with a hydroxyl number of about 95 or copolymers consisting of styrene and unsaturated mono- or dicarboxyic esters with an amount of $\beta$-hydroxyalkyl groups with a hydroxyl number of about 100.

Suitable bisazlactones are those falling within the scope of the aforementioned Formula I. The substituents in the 4-position, $R_1$ and $R_2$, are preferably methyl groups but they may also be alkyl groups having up to 8 carbon atoms, with one of the substituents preferably being a lower alkyl group. For example, either one of the two substituents, $R_1$ and $R_2$ can be hydrogen with the other one being an aromatic or a cycloaliphatic radical. Substituents $R_1$ and $R_2$ have, among other things, an influence on the melting point of said bisazlactone. Radical $R_3$ may be an alkylene having from 2 to 6 carbon atoms or arylene of from 6 to 16 carbon atoms. The use of arylene radicals is, however, preferred in the production of colourless or white lacquers since the bisazlactones wherein the two azlactone rings are coupled to each other by means of saturated aliphatic chains, are responsible for slight discolourations. The arylene radical can also carry many different substituents, e.g. alkyl, aryl and acyl radicals having 2 to 8 carbon atoms or halogens such as chlorine, bromine or flourine. The choice of substituents permits one to vary not only the properties of the bisazlactone with respect to its solubility in the polyhydroxyl compound and with respect to its melting point but also the properties of the lacquer resin, as, for instance, levelling during the baking operation.

The preparation of bisazlactones is known (see the previously mentioned Cleaver & Pratt reference, especially pages 1544 to 1547). Generally, a dicarboxylic acid dichloride is reacted with an alpha-amino acid according to the Schotten-Baumann reaction in the presence of alkali and, subsequently, the ring closure is effected by splitting off water. Suitable dicarboxylic acid chlorides include, for example, succinic acid dichloride, adipic acid dichloride, suberic acid dichloride, fumaric acid dichloride, unsubstituted or substituted isophthalic acid dichloride or terephthalic acid dichloride. Suitable alpha-amino acids are, for instance, glycine, alanine, leucine, phenylalanine, alpha-aminoisovalerianic acid. Depending on the respective compounds from which said bisazlactone is prepared, the melting point and other properties of said bisazlactone can be predetermined. As a rule, a bisazlactone is selected which has a melting point ranging from 100° to 140° C. however a bisazlactone compound melting at a higher temperature may be utilized provided it possesses good solubility in said polyhydroxyl compound with which the higher melting bisazlactone is mixed. As mentioned before, especially useful bisazlactones are derived from aromatic di-carboxylic acid dichlorides in case transparent varnishes of from white to light-colored varnishes are desired. Where minor discolorations does not matter, bisazlactones from saturated carboxylic acids may be employed. A second especially preferred class of bisazlactones are those prepared from isophthalic acid dichloride and alpha-aminoisobutyric acid or alpha-aminoisovalerianic acid because of their favourable melting points (129° to 103° C, respectively) and because they do not show any tendency to discolouration.

As mentioned before, the cross-linking reaction is surprisingly activated by means of a strong acid. Such acids are, for example, hydrochloric acid, phosphoric acid, sulfuric acid, organic sulfonic acids, such as benzene sulfonic acid, p-toluene sulfonic acid, naphthalene sulfonic acid, etc. If these acids were added unblocked to the mixture of the polyhydroxyl compound and cross-linking agent, an immediate cross-linking reaction would occur. According to the present invention, these difficulties are overcome by employing as the catalyst thermolabile compounds of the acids which are preferably crystalline, as, for example, alkylamine comprising alkyl groups having from 2 to 8 carbon atoms, alkylene diamines having from 2 to 8 carbon atoms, etc. Representatives of the thermolabile amine salts useful in this invention are pentylamine sulfonate, hexamethyleneditolyl sulfate, etc. Suitable ester components according to the invention are secondary terpene alcohols like menthol, borneol, terpineol, and also other alcohols which form defined crystalline esters with the said acids. Especially well suited are the esters from bromobenzene or toluene sulfonic acid with borneol and menthol. Such esters can be easily recrystallized and can therefore be conveniently purified to remove free acids. The complete removal of the acid is a prerequisite so that there is no premature start of the cross-linking reaction. It is surprising that only crystalline esters or amines from the organic sulfonic acids which are not easily volatilized among them benzene sulfonic acid, toluene sulfonic acids, halogenated organic sulfonic acids, and the like, are all around activators suitable for varnishes and for pigmented varnishes, as well. The phosphoric acid glycidyl ester (which is not crystalline), for instance, activates well in varnishes formulations (see Example 6). In contrast thereto, in formulations containing commercially available titanium white pigments, the cross-linking reaction which takes place under the same baking conditions is insufficient.

The splitting or decomposition temperatures of the activator according to this invention are in the range of between 120° and 150° C. Depending on the powder resin mixtures melting behavior, the activator selected may either be one of the more active type or one of the type more difficult to be decomposed. For instance, the decomposition point of said borneyl toluene sulfonic acid ester is 135° C.

The coatings according to the invention are composed of from 65 to 98 percent by weight of binder, from 0 to 35 percent by weight of pigments, and from 0 to 2 percent of levelling agents and other additives. The binder is composed of from 83 to 93 percent by weight of resinous hydroxyl compounds (basis the binder), from 5 to 15 percent by weight of bisazlactone and from 0.25 to 2 percent by weight of activator.

Mixing of the compositions of this invention is done at temperatures of about 100° to 120° C in, for example, a heatable screw extruder, followed by powderizing and recovering by screening the grain fraction having a size smaller than 100μ. The powder does not form lumps at storing temperatures of up to 40° C, and it does not show any tendency to cross-linking when being heated up to a temperature of 120° C. The powder coatings compositions are applied in the usual way, i.e., by the electrostatic powder spray coating technique, and the baking is preferably done in a heated circulating air drier. Baking temperatures may be adjusted within certain limits by the choice of the respective activator.

The invention is illustrated by way of the Examples 1–8 as set out below which are to be considered not limitative. All of the examples are carried out in the same way.

EXAMPLES I–VIII 180 grams of the resinous polyhydroxyl compound was homogenized in the melt in a kneader at a temperature of between 110° and 120° C for 10 minutes, with 20 grams of the bisazlactone cross-linking agent, 3 grams of a commercially available levelling agent (Acronal F 4 of BASF, a liquid polyacrylate resin), 86 grams of titanium white pigment (Kronos C Cl 220 of Messrs. Kronos), and 3 grams of activator. After the melt has cooled down, it was powderized, the grain fraction of smaller than 100μ was recovered by screening and applied onto phosphatized iron test sheets or onto chromatized aluminum test sheets. The films, which were 70 to 80 microns in thickness were subjected to baking and the finished varnishes were tested with respect to their properties.

Table I shows the starting materials, i.e., the polyhydroxyl compounds, cross-linking agent and activator with which the powder coatings of Examples 1 to 8 have been prepared.

Table II summarizes the conditions under which said powder coatings of Examples 1 to 8 were baked, and the data showing the outstanding properties of the finished varnishes prepared from the power coating composition of this invention (see Examples 1–7 inclusive).

The properties of the finished lacquer films were determined by the testing methods listed below:

| | |
|---|---|
| Erichsen deepening (according to DIN Standard No. 50101) | a measure of the elastic behavior or of the extensibility of the varnish |
| Impact deepening (according to DIN Standard No. 53156) | a measure of the coatings' behavior when sudden deformation takes place |
| Cross-cut adhesion (according to DIN Standard No. 53151) | a measure for judging the adhesive strength |
| Gloss according to Gardner | measured by a beam of light at an angle of incidence of 20° |
| Pendulum hardness according to Koening (according to DIN No. 53157) | a method for determining the film hardness |

TABLE I

RESINS, HARDENERS, AND ACTIVATORS USED IN EXAMPLES 1–8

| Example No. | Resinous polyhydroxyl Compound | Bisazlactone cross-linking agent-meaning of $R_1$, $R_2$ and $R_3$ in the general formula I | Activator |
|---|---|---|---|
| 1 | Hydroxylpolyester; OH-number 95 *) | $R_1$ and $R_2$ : $CH_3$; $R_3$:-1,3-Phenylene- | Borneyl toluene sulfonate |
| 2 | Styrene-acrylate-hydroxyl-acrylate copolymer OH number 100 | $R_1$ and $R_2$:—$CH_3$; $R_3$:-1,3-Phenylene- | Borneyl toluene sulfonate |
| 3 | Hydroxylpolyester; OH-number 95 *) | $R_1$ and $R_2$:—$CH_3$; $R_3$:—$(CH_2)_4$— | Borneyl toluene sulfonate |
| 4 | Hydroxylpolyester; OH-number 95 *) | $R_1$ and $R_2$:—$CH_3$; $R_3$:-1,3-Phenylene- | n-Octylamine salt of p-toluene sulfonic acid |
| 5 | Hydroxypolyester; OH-number 95 *) | $R_1$ and $R_2$:—$CH_3$; $R_3$:-1,3-Phenylene | Phosphoric acid-glycidyl adduct |
| 6 | Hydroxylpolyester OH-number 95 without pigment *) | $R_1$ and $R_2$:—$CH_3$; $R_3$:-1,3-Phenylene- | Phosphoric acid-glycidyl adduct |
| 7 | Hydroxypolyester OH number 95 *) | $R_1$ and $R_2$:—$CH_3$; $R_3$:-1,3-Phenylene- | p-Bromobenzene sulfonic acid |
| 8 (Example of Comparison) | Hydroxypolyester; OH-number 95 *) | $R_1$ and $R_2$:—$CH_3$; $R_3$:-1,3-Phenylene | no activator |

*) as specified on page 6, lines 4 to 6.

TABLE II

Baking conditions and properties of the Lacquers obtained by using the coatins according to Examples 1 to 8

| Example No. | Baking conditions Temp. °C | Time (min) | Erichsen deepening (mm) | Impact deepening (mm) | Cross-cut adhesion | Gloss 20° C | hardness (Koening) | discoloration |
|---|---|---|---|---|---|---|---|---|
| 1 | 165 | 30 | 8,8 | 2 | 0–1 | 90 | 196 | none |
|   | 175 | 30 | 8,5 | 3 | 0 | 85 | 190 | none |
|   | 185 | 30 | 8,5 | 4 | 0 | 87 | 190 | none |
| 2 | 175 | 30 | 7,5 | 2 | 0–1 | 75 | 185 | none |
| 3 | 175 | 30 | 8,5 | 3 | 0 | 85 | 175 | slightly yellow |
| 4 | 175 | 30 | 8,0 | 2 | 0 | 85 | 180 | none |
| 5 | 175 | 30 | 3 | 0 | 3–4 | 90 | 185 | none |
| 6 | 175 | 30 | 8,5 | 2 | 0 | — | 160 | none |
| 7 | 155 | 30 | 7,5 | 1 | 0–1 | 80 | 155 | none |
| 8 | 175 | 30 | 1 | 0 | 4 | 85 | 190 | none |
|   | 210 | 30 | 4 | 0 | 2–4 | 60 | 185 | brownish |

In using phosphatized iron sheets, the data were the same as in using chromatized aluminum sheets.

What is claimed is:

1. A powder coating composition comprising resinous polyhydroxy compounds as film-forming agents cross-linking agents and the conventional additives, such as levelling agents and optionally pigments, characterised by a bisazlactone as a cross-linking agent having the general formula (I):

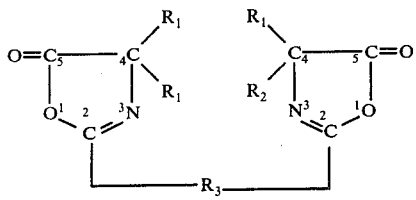

wherein $R_1$ and $R_2$ are selected from the group consisting of hydrogen, alkyl having 1 to 8 carbon atoms, cycloalkyl having from 4 to 16 carbon atoms or aryl having from 6 to 16 carbon atoms, wherein only one of $R_1$ and $R_2$ may be hydrogen, or wherein $R_1$ and $R_2$ together with the C in 4-position form a cycloaliphatic ring having from 4 to 12 carbon atoms; wherein $R_3$ is selected from the group consisting of alkylene having from 2 to 6 carbon atoms or arylene having from 6 to 16 carbon atoms, as the cross-linking agent, and a blocked acid as the activator; wherein said resinous polyhydroxy compounds are selected from the group consisting of (a) polyesters of glycols and terephthalic acid modified with triols and having a hydroxyl number of about 95 and (b) copolymers of styrene and unsaturated mono- or dicarboxylic esters having B-hydroxyalkyl groups and a hydroxyl number of about 100; wherein the said coating composition is composed of from 65 to 98 percent by weight of binder, from 0 to 35 percent by weight of pigments, and from 0 to 2 percent by weight of levelling agents and other additives and wherein the said binder is composed of from 83 to 93 percent by weight of said resinous polyhydroxy compounds based on the weight of the binder, from 5 to 15 percent by weight of the said bisazalactone and from 0.25 to 2 percent of the said activator.

2. The powder coating composition according to claim 1, characterized by a bisazlactone of the general formula of Claim 1 wherein $R_1$ and $R_2$ are alkyl having 1 to 3 carbon atoms and $R_3$ is the 1,3-or 1,4-phenylene radical.

3. The powder coating composition according to claim 1, characterized by a bisazlactone of the general formula of claim 1 wherein $R_1$ is —$CH_3$, $R_2$ is —$CH_3$ and $R_3$ is the 1,3-phenylene radical.

4. The powder coating composition according to claim 1, characterized by a bisazlactone of the general formula of claim 1 wherein $R_1$ is —$CH_3$, $R_2$ is —$CH_3$ and $R_3$ is the radical —$(CH_2)_4$—.

5. The powder coating composition of claim 1 wherein the said activator has a composition temperature with accompanying release of the acid component thereof of about 120° and 150° C.

6. The powder coating composition of claim 1 wherein the said activator is borneyl toluene sulfonate.

7. The powder coating composition of claim 1 wherein the said activator is the N-octylamine salt of p-toluene sulfonic acid.

8. The powder coating composition of claim 1 wherein the said activator is p-bromobenzene sulfonic acid.

9. The powder coating composition of claim 1 wherein the said activator is a crystalline thermolabile compound selected from the group consisting of an ester of a difficulty volatile sulfonic acid and an amine salt of the same sulfonic acid.

10. The powder composition of claim 9 wherein the amine component of the said amine salt of the difficulty volatile sulfonic acid is derived from a material selected from the group consisting of an alkylamine having 5 to 8 carbon atoms and an alkylene diamine having 2 to 8 carbon atoms.

11. The powder coating composition of claim 9 wherein the thermolabile amine salt is selected from the group consisting of pentylamine sulfonate, hexamethyleneditolyl sulfate and the N-octylamine salt of p-toluene sulfonic acid.

12. The powder composition of claim 9 wherein the said ester component of the said ester of the difficulty volatile sulfonic acid is an alcohol selected from the consisting of menthol, borneol and terpineol.

13. The powder coating composition of claim 1, wherein the said composition contains about 5 to about 15 wt. percent of the cross-linking agent and about 0.25 to about 2 weight percent of the activator based on the combined weight of the film-forming agent, cross-linking agent and activator.

* * * * *